(12) United States Patent
Kleinikkink et al.

(10) Patent No.: US 9,600,851 B2
(45) Date of Patent: Mar. 21, 2017

(54) SYSTEM AND METHOD FOR TRACKING A MOVING ELEMENT IN A CONVEYOR SYSTEM

(71) Applicant: ATS AUTOMATION TOOLING SYSTEMS INC., Cambridge (CA)

(72) Inventors: Albert John Kleinikkink, Cambridge (CA); John Leo Ditner, Cambridge (CA); Graham Richard Knap, Cambridge (CA)

(73) Assignee: ATS AUTOMATION TOOLING SYSTEMS INC., Cambridge, Ontario (CA)

( * ) Notice: Subject to any disclaimer, the term of this patent is extended or adjusted under 35 U.S.C. 154(b) by 3 days.

(21) Appl. No.: 14/445,673

(22) Filed: Jul. 29, 2014

(65) Prior Publication Data
US 2015/0028098 A1    Jan. 29, 2015

Related U.S. Application Data

(60) Provisional application No. 61/859,431, filed on Jul. 29, 2013.

(51) Int. Cl.
*G06K 7/10* (2006.01)
*G06Q 40/00* (2012.01)
(Continued)

(52) U.S. Cl.
CPC ......... *G06Q 90/00* (2013.01); *G11B 7/00454* (2013.01); *G11B 20/1419* (2013.01); *G11B 27/321* (2013.01)

(58) Field of Classification Search
CPC .. G06Q 90/00; G06Q 20/042; G11B 20/1217; G11B 2220/216; G11B 2220/2575; G11B 27/24; G11B 7/0045; G11B 7/00718; G11B 27/3027; G11B 5/012; G11B 5/59688; G11B 7/007; G11B 7/00745; G11B 2020/1239; G11B 2020/1268;
(Continued)

(56) References Cited

U.S. PATENT DOCUMENTS 6,191,507 B1    2/2001  Peltier et al.
6,744,718 B1 *  6/2004  Choi et al. ........... G11B 7/0045
                                                        369/44.13
(Continued)

OTHER PUBLICATIONS

Canadian Intellectual Property Office, International Search Report and Written Opinion for PCT Appln. No. PCT/CA2014/050716, Oct. 2, 2014.

*Primary Examiner* — Dionne H Pendleton
(74) *Attorney, Agent, or Firm* — Gowling WLG (Canada) LLP; Neil Henderson

(57) ABSTRACT

A system for tracking position and identification of a moving element on a conveyor system having a track, the system including: a machine readable medium provided to one of the moving element or the track, wherein the machine readable medium is configured with at least two channels with a predetermined phase difference therebetween; a sensor provided to the other of the moving element or the track, wherein the sensor is configured to read the at least two channels; and a controller configured to receive data from the sensor and determine a position and/or identification of the moving element on the track based on the phase difference.

11 Claims, 11 Drawing Sheets

(51) Int. Cl.
*G06Q 90/00* (2006.01)
*G11B 7/0045* (2006.01)
*G11B 20/14* (2006.01)
*G11B 27/32* (2006.01)

(58) Field of Classification Search
CPC ........ G11B 19/045; G11B 2020/10759; G11B 2020/1232; G11B 2020/1298; G11B 20/10046; G11B 20/10222; G11B 20/10398; G11B 20/10527; G11B 20/1208; G11B 20/1211; G11B 20/1403; G11B 20/1426; G11B 2220/02; G11B 27/28; G11B 27/3063; G11B 27/323; G11B 5/09; G11B 5/746; G11B 7/08541; G11B 7/0903; G11B 21/081; G11B 21/10; G11B 5/488; G11B 5/4886; G11B 5/4893; G11B 5/5556; G11B 5/596; G11B 7/005; G01D 5/24409; G01D 5/3473; G01D 5/34746; G01D 5/366; G07D 7/00; G07F 19/20
See application file for complete search history.

(56) References Cited

U.S. PATENT DOCUMENTS

| | | | |
|---|---|---|---|
| 6,934,098 B2* | 8/2005 | King | G06K 7/084 |
| | | | 360/101 |
| 7,108,189 B2 | 9/2006 | Kilibarda | |
| 7,416,130 B2 | 8/2008 | Kilibarda | |
| 7,735,721 B1* | 6/2010 | Ma | G06Q 20/042 |
| | | | 235/379 |
| 8,109,443 B2 | 2/2012 | Kilibarda | |
| 2009/0321520 A1* | 12/2009 | Martenson | G01D 5/24409 |
| | | | 235/454 |
| 2013/0180824 A1 | 7/2013 | Kleinikkink et al. | |
| 2013/0223198 A1* | 8/2013 | Ando | G11B 7/00458 |
| | | | 369/44.11 |

* cited by examiner

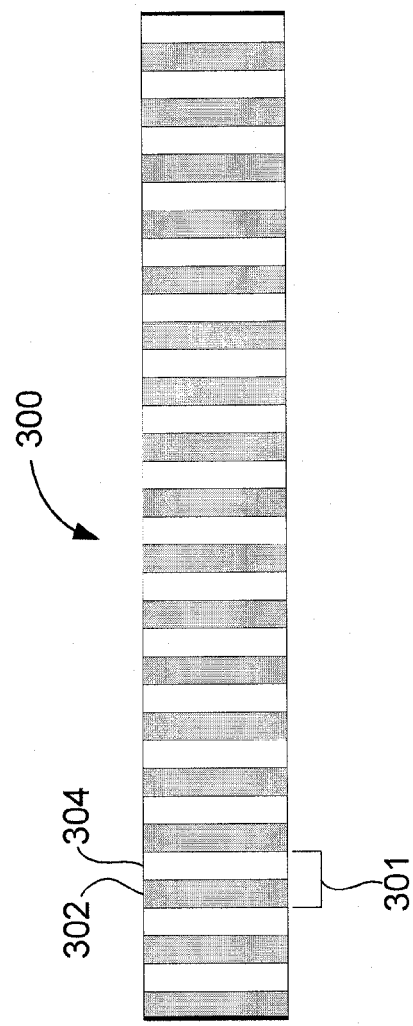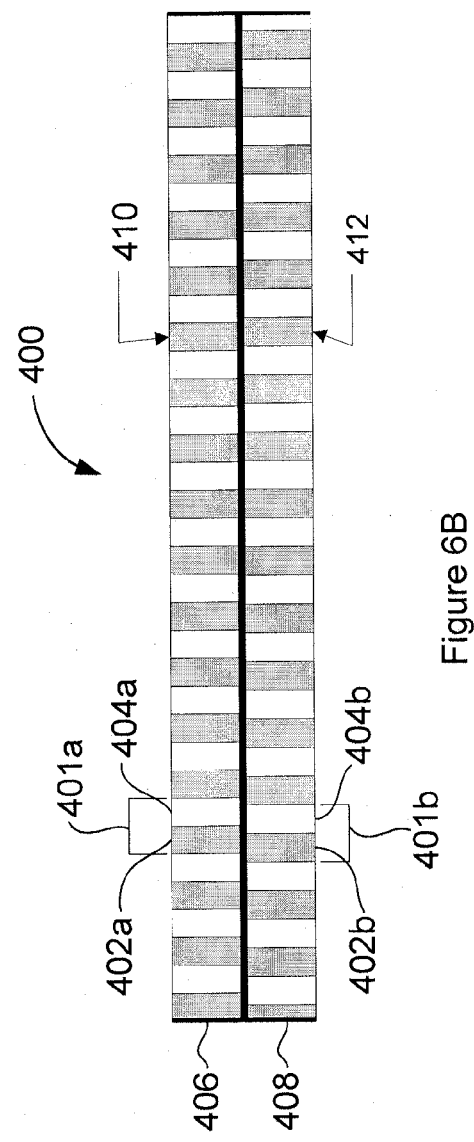

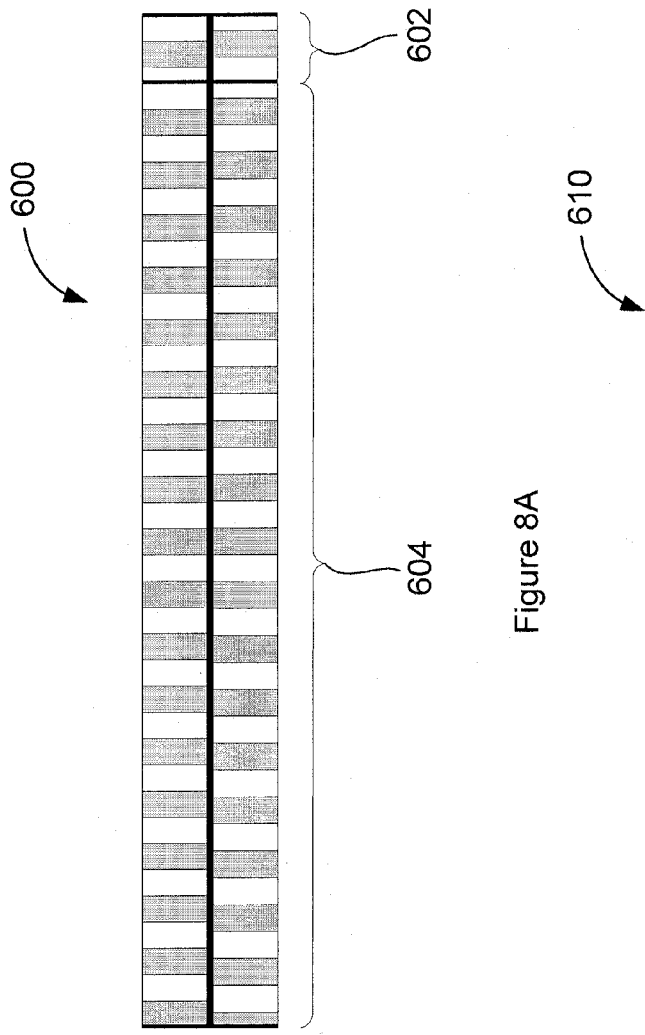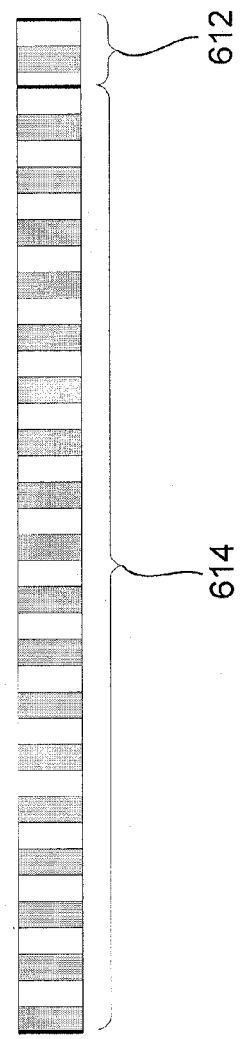
Figure 8A
Figure 8B

SYSTEM AND METHOD FOR TRACKING A MOVING ELEMENT IN A CONVEYOR SYSTEM

FIELD

The present disclosure generally relates to systems and methods for tracking a moving element in a conveyor system, and more specifically to linear motor conveyor systems and methods that provide feedback regarding position and identity of moving elements, pallets, fixtures, products or the like in a manufacturing environment.

BACKGROUND

It may be desirable to track a specific product or item through a manufacturing process. For example, it can be useful to know the position of each product or item in the manufacturing process.

A unique identifier or "ID" is typically assigned to the specific item or a pallet/moving element associated with the item. Based on this unique ID, a manufacturing system can track process data, performance data, product genealogy and the like. Manufacturing systems can also report status, make routing decisions, select assembly options and the like. Examples of existing ID tracking systems in manufacturing include stationary radio frequency (RF) read/write heads with RF tags mounted on the items being tracked, barcode scanners with barcode labels fastened to the items being tracked, and vision cameras reading a unique identification code on the item with optical character recognition (OCR).

There are certain limitations with conventional conveyor ID tracking systems. Firstly, conventional ID readers do not generally provide the location of the item along with the ID that is read. Secondly, in certain conventional ID tracking systems, the ID is only available at stationary readers and not at all positions/times along the path an item is travelling. Thirdly, conventional ID readers can cause delays in a system because the item may have to slow down or stop in front of the reader when the ID is being read. Fourthly, in conventional ID systems, there may need to be physical access to a tag or the like for a reader to be able to read it. Also, the readers will generally occupy physical space for mounting on the system.

Further, conventional systems may be prone to faults. If readers are bumped or shifted, it could lead to failures due to misalignment or excessive gaps. Readers based on optics may be prone to faults due to dirt or an inability to read poor labels. Tags that rely on battery power may be prone to failure when batteries run low. Provisions may need to be made on systems to handle invalid reads. In certain conventional ID tracking systems, added hardware may be required to be incorporated into the system.

There are also certain limitations to conventional position feedback systems. For example, to control and move a pallet on a linear motor based conveyor, the position of each pallet is provided to a controller that precisely controls the pallet movement. This position feedback may be of a high resolution and a high speed. An example of an existing position feedback system used in manufacturing is magnetic readers that read magnetic fields of magnets placed on the pallet or carrier in the form of a magnetic strip or the like.

Conventional position feedback systems may be limited by only providing position of pallets or carriers so their movements can be controlled. Conventional systems may control multiple pallets, using the real time position feedback, but added hardware may be required to track the specific pallet or fixture number that is generally needed for ID tracking.

In the case of a standalone identification reader, it is advantageous to know the precise position of the item along with the unique identifier. Operations or tasks can better be performed when the precise location of the item is known. Take the example of a robot performing an assembly operation on a product in a manufacturing cell. With a unique identification tracking code, the system can determine what operations need to be performed by the robot on the product. If the location of the product is included along with its identification tracking code, the robot would know precisely where the product is located to start working on the product.

In the case of a linear motor conveyor, the location of all pallets is typically known but it is advantageous to also have a unique identifier for each pallet along with the position feedback.

As such, there is a need for improved tracking systems and methods in conveyor systems.

SUMMARY

It is an object of embodiments of the systems and methods herein to overcome or mitigate at least one disadvantage of previous systems. In a particular case, embodiments are intended to provide solutions that combine identification tracking with real-time position feedback.

In a first aspect, the present disclosure provides a system for tracking position of a moving element on a conveyor system having a track, the system including: a machine readable medium provided to one of the moving element or the track, wherein the machine readable medium is configured with at least two channels with a predetermined phase difference therebetween; a sensor provided to the other of the moving element or the track, wherein the sensor is configured to read the at least two channels; and a controller configured to receive data from the sensor and determine a position of the moving element on the track based on the phase difference.

In a particular case, the sensor may be located on the track and the machine readable medium may be located on the moving element.

In another particular case, the machine readable medium may be a magnetic strip and the sensor may be a magnetic detector.

In yet another particular case, the at least two channels may include a first channel and a second channel and the sensor may include a first sensor configured to read the first channel and a second sensor configured to read the second channel.

In still another particular case, the predetermined phase difference is a first phase difference and the system further includes: an identification (ID) medium provided to the one of the moving element or the track having the machine readable medium, wherein the identification medium is configured with at least two channels with a second predetermined phase difference therebetween, and wherein the controller receives data from the sensor and determines an identifier of the moving element based on the second phase difference.

In another particular case, the track may include a linear motor and the moving element may include a plurality of magnetic elements that engage with the linear motor.

According to another aspect herein, there is provided a method for tracking a moving element on a track of a conveyor including: reading first data from a first channel of a machine readable medium; reading second data from a second channel of a machine readable medium, wherein the second channel has a phase difference from the first channel; and determining a position of the moving element on the track based on the first data and the second data.

In a particular case, the method may further include: determining an identifier of the moving element based on the phase difference between the first data and the second data.

In another particular case, the first data and the second data may be read by a plurality of sensors.

According to another aspect herein, there is provided a method for tracking a moving element on a track of a conveyor including: reading an identifier of the moving element from a first portion of a machine readable medium; and reading a position of the moving element on the track from a second portion of the machine readable medium.

According to yet another aspect herein, there is provided a system for providing identification for a moving element on a conveyor system having a track, the system including: a machine readable medium provided to one of the moving element or the track, wherein the machine readable medium is configured with a phase difference; a sensor provided to the other of the moving element or the track, wherein the sensor is configured to read the machine readable medium; and a controller configured to receive data from the sensor and determine an identifier of the moving element based on the phase difference.

In a particular case, the machine readable medium may include at least two channels and the sensor is configured to read the at least two channels.

According to yet another aspect herein, there is provided a machine readable medium for a moving element in a conveyor system, the machine readable medium including at least one channel, the channel including: an identification tracking portion for identifying the moving element; and a position feedback portion for determining the position of the moving element in the conveyor system.

In a particular case, the machine readable medium may include a plurality of channels, wherein the plurality of channels are configured with phase differences therebetween.

According to yet another aspect herein, there is provided a position and identification tracking system including: a machine readable medium configured with at least two channels with a predetermined phase difference therebetween; and a sensor configured to read the at least two channels; wherein a position and an identification is determined based on the phase difference.

In a particular case, the predetermined phase difference includes a first predetermined phase difference and a second predetermined phase difference, and wherein the position is determined based on the first predetermined phase difference and the identification is determined based on the second predetermined phase difference.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 6A is a machine readable medium having one channel, in accordance with an embodiment;

FIG. 6B is a machine readable medium having two channels, in accordance with a further embodiment;

FIGS. 8A and 8B are machine readable media having an identification section and a position section, in accordance with a further embodiment.

DETAILED DESCRIPTION

Generally, the present disclosure provides a method and system for integrated identification tracking and real-time position feedback.

It is generally desirable to be able to acquire a unique identifier of a moving element anywhere throughout the system, to read the identifier on-the-fly without having to slow down, to have high reliability, and for the identification readers to be integral to the system and not require added hardware. Existing conveyor systems that have identification tracking will typically have added hardware as indicated above.

Figure 1:
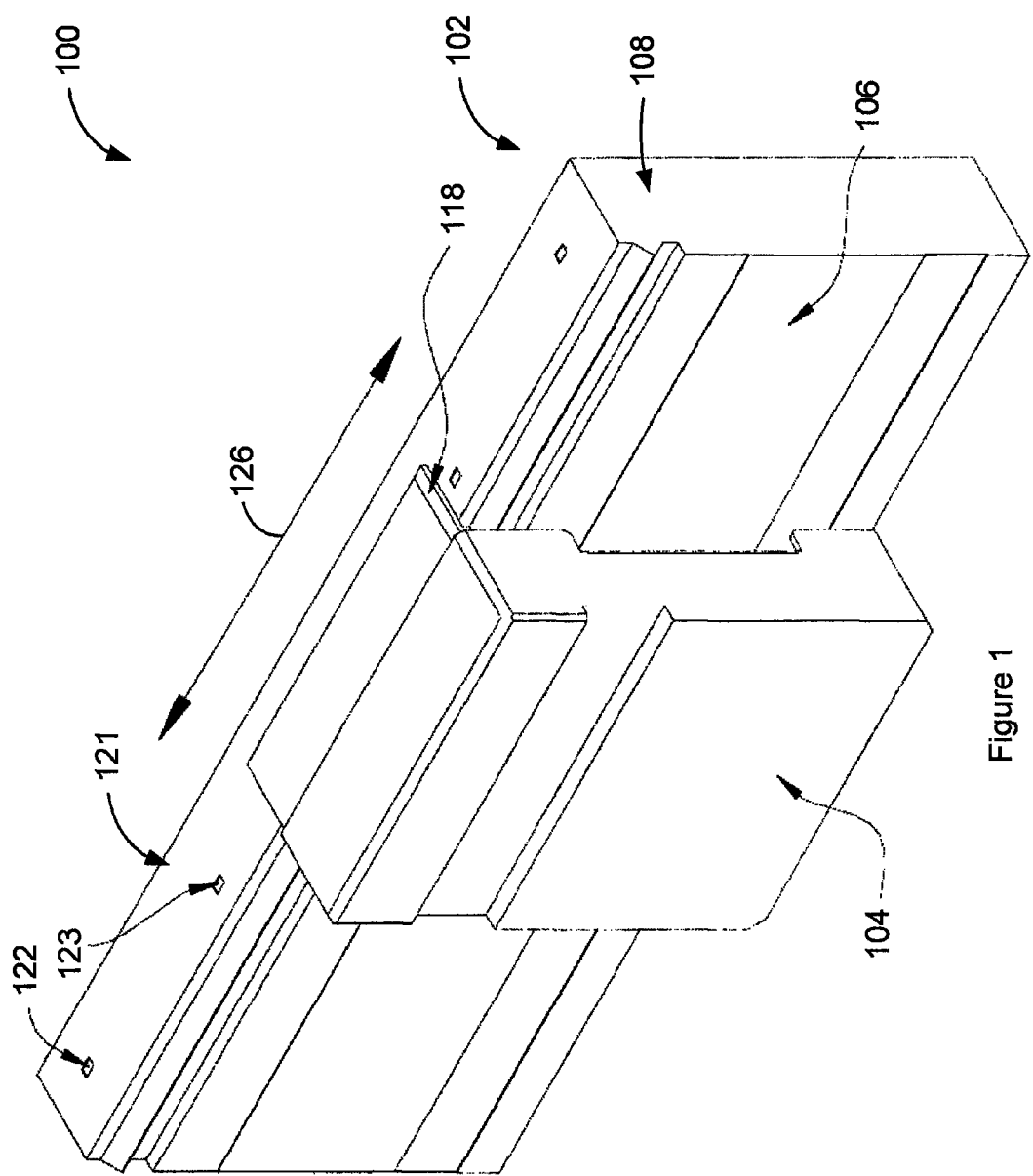
FIG. 1 is a track section of a conveyor system with a moving element, in accordance with an embodiment.

FIG. 1 illustrates a conveyor system 100 having a track section 102. The track section 102 features one or more moving elements 104 (only one is illustrated) which are configured to ride or travel along a track 106 of the track section 102. The track 106 includes a frame 108 configured to support the moving element 104. Some of the principles of operation of a similar track section are described in more detail in U.S. Pat. No. 8,397,896 to Kleinikkink et al., which is hereby incorporated herein by reference.

The conveyor system 100 can be composed of a plurality of track sections 102 which are mechanically self-contained and quickly and easily separable from one another so as to be modular in nature. In this modular example, the track sections 102 are mounted on a support (not shown) so as to align and abut one another in order to form a longer track. In order to be modular, each track section 102 may house self-contained electronic circuitry for powering and controlling the track section 102. The conveyor system 100 may also include curvilinear track sections 102.

Figure 2A:
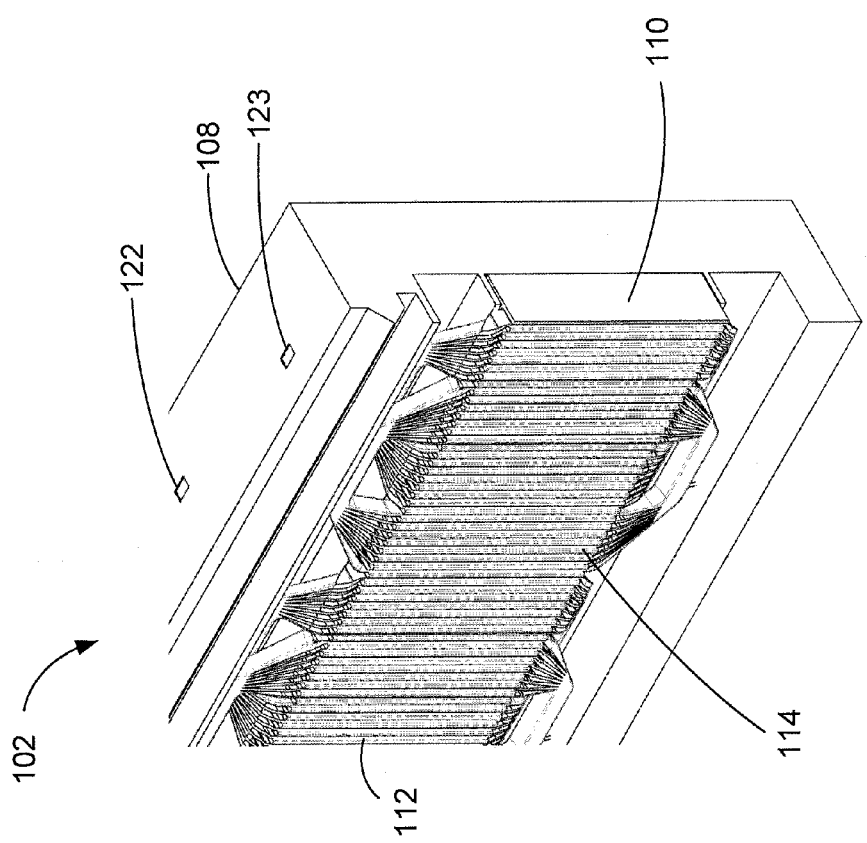
FIG. 2A is a perspective view of the track section of FIG. 1 having a cover removed to show a linear drive mechanism.
Figure 2C:
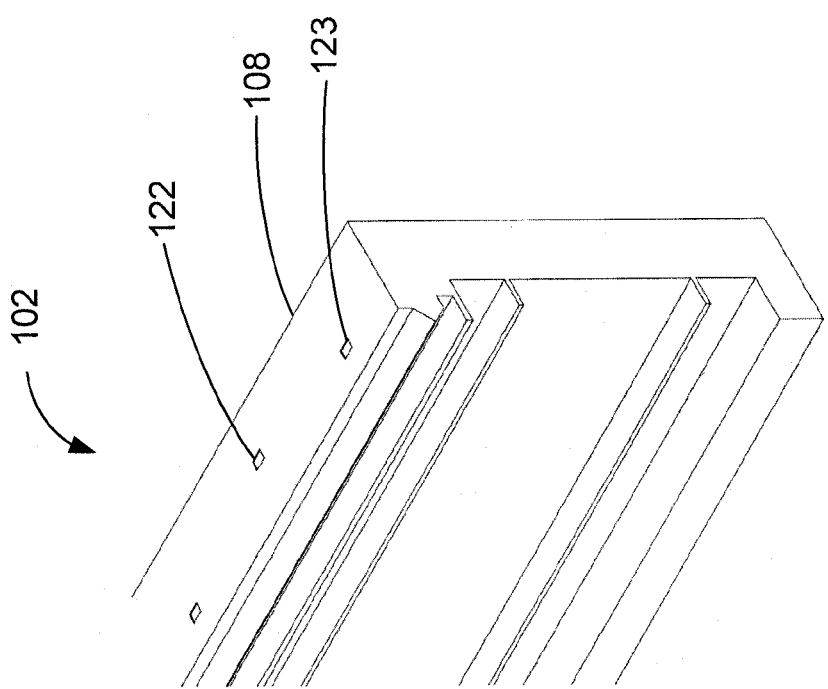
FIG. 2C is a perspective view of the track section of FIG. 1 with the linear drive mechanism removed.
Figure 2B:
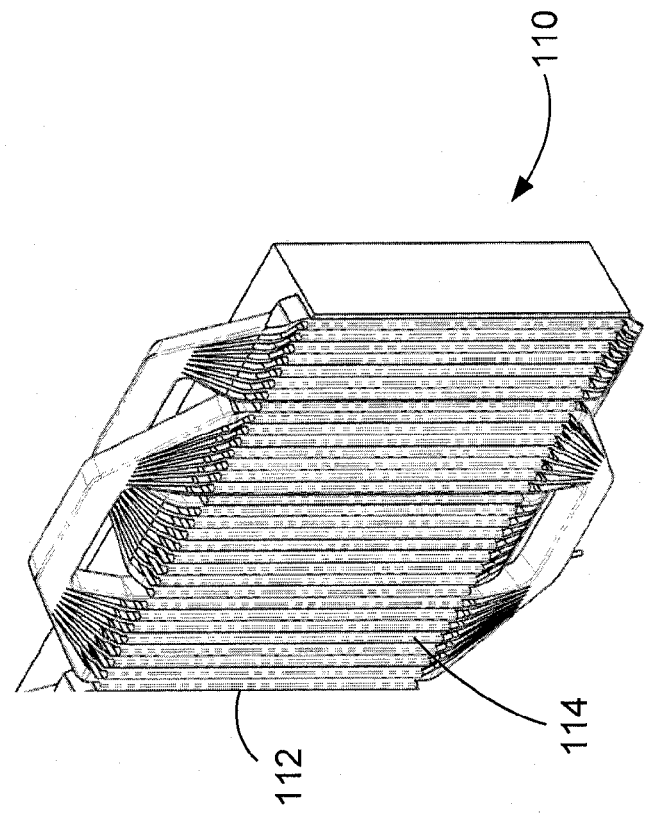
FIG. 2B is a perspective view of a linear drive mechanism of the track section of FIG. 1.

FIG. 2A illustrates a perspective view of the track section 102. FIGS. 2B and 2C illustrate an exploded view of the track section 102. The track section 102 includes the frame 108 that houses a linear drive mechanism 110. The linear drive mechanism 110 is formed as a stator armature 112 including a plurality of embedded coils 114. The embedded coils 114 can be individually excited so that an electrically-induced magnetic flux produced by the stator armature 112 is located adjacent to a given moving element 104 to be controlled, in a direction normal thereto, without affecting adjacent moving elements 104. The motive force for translating each moving element 104 arises from the magnetomotive (MMF) force produced by elements 124, such as permanent magnets, provided to each moving element 104 (shown in FIG. 5) and the stator armature 112, i.e., by the tendency of the corresponding magnetic fluxes provided by the stator armature 112 and moving element 104 to align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104.

Referring again to FIG. 1, each moving element 104 includes an extension 118 provided with a machine readable medium 120 (shown in FIG. 5B), which may be, for example, a magnetic strip, an optically transmissive or reflective strip, other type of feedback system or the like. The extension 118 is configured such that the machine readable medium 120 interacts with sensors 122, 123 provided to the track 106. The sensors 122, 123 are configured to read the machine readable medium 120, whether magnetically, optically, or otherwise. The machine readable medium 120 and sensors 122, 123 form a position sensing system 121. The position sensing system 121 may be arranged such that the position sensing system 121 is protected from traffic on the track section 102 and dust and other debris. The position sensing system 121 is employed in the moving element identification and position-detecting subsystem (described in further detail below).

In the illustration of FIG. 1, the sensors 122, 123 are located on the track section 102 and the machine readable medium 120 is located on the moving element 104. In an alternative, the sensors 122, 123 may be located on the moving element 104 and the machine readable medium 120 may be located on the track section 102. The sensors 122, 123 are configured to read an identifier of the moving element 104 from the machine readable medium 120. The same sensors 122, 123 are configured to read a position of the moving element 104 on the track section 102 from the machine readable medium 120.

Figure 3:
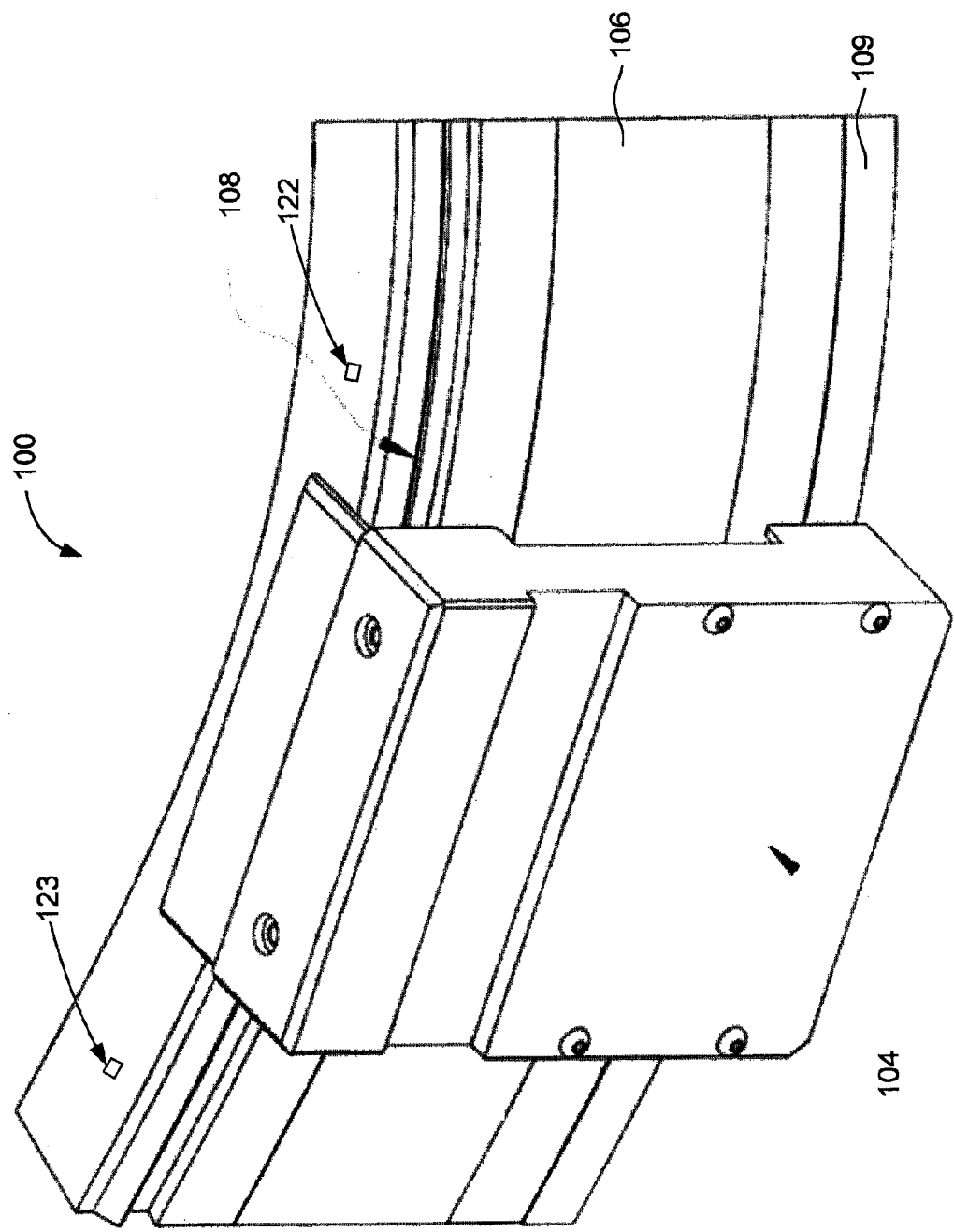
FIG. 3 is a perspective view of a conveyor system having a curved track section, in accordance with an embodiment.

FIG. 3 illustrates a conveyor system 100 having a curvilinear profile, in accordance with a further embodiment. Where the track section 102 is curvilinear, the sensors 122, 123 are positioned along the curvilinear profile such that the machine readable medium 120 can be read by the sensors 122, 123 and the readings are then translated from the curvilinear profile to a linear profile, using linear units such as microns, for the purposes of feedback control. Control of the moving element 104 can then occur in the linear profile/linear units.

Figure 4:
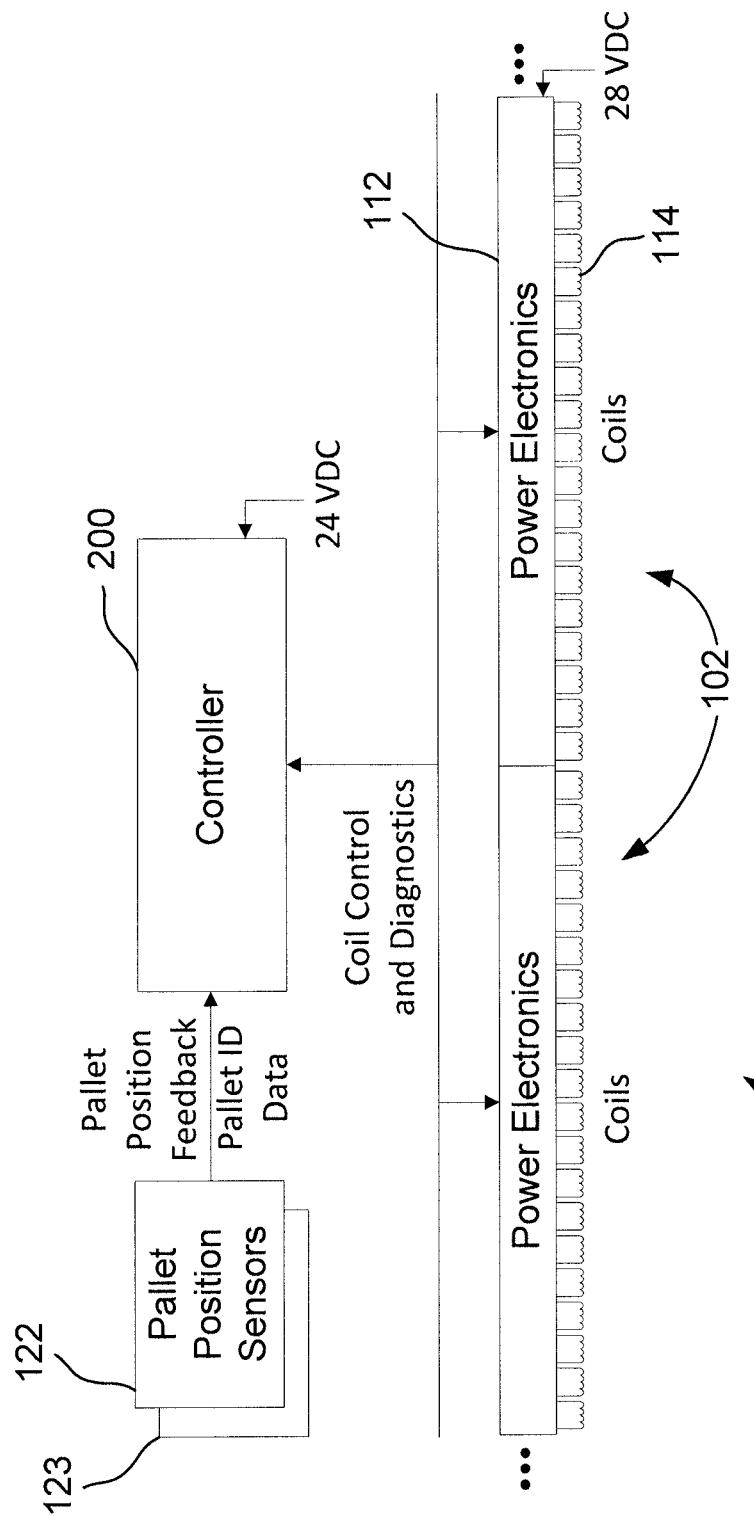
FIG. 4 is a is a block diagram of an example control architecture employed in the conveyor system.

FIG. 4 is a block diagram of an example control architecture employed in the conveyor system 100. Controller 200 controls the conveyor system 100 and the track sections 102. The controller 200 is configured to monitor the position of and control the movement of moving elements 104 based on the position. The controller 200 may also monitor and report moving element identification data so the moving element identifier is known and can be tracked throughout the conveyor system 100. As such, the controller 200 may be used for process (i.e. manufacturing-line) control. The controller 200 may also provide a supervisory diagnostic role by monitoring the track sections 102 (e.g., by engaging in a continuous polling or pushing process) in order to determine the current status of any track section 102 and whether any track section 102 has failed. It will be understood that, in some cases, the controller 200 may directly control each of the track sections 102.

The controller 200 may also be connected to other devices, such as programmable logic controllers (PLCs) (not shown) via input/output (I/O) or network modules. The PLCs may provide manufacturing-line station-processing instructions to the track section 102, such as directing the next destination for a moving element 104 along the track 106, or providing station-specific motion instructions in respect of a given moving element 104.

As illustrated, the controller 200 is connected to the stator armature 112 and coils 114 in the track sections 102 and controls the coils 114 in accordance with an independent trajectory or "move" command for each moving element 104 located therein.

The controller 200 is also connected to the sensors 122, 123 situated in the track section 102. The controller 200 is configured to implement a closed-loop digital servo control system that controls movement of the moving element 104 by resolving the real-time position of each moving element 104 located in the track section 102. The controller 200 makes use of the position sensing system 121, which supplies moving element identification data and moving element position data to the controller 200. When the machine readable medium 120 of a given moving element 104 moves over a given sensor 122, 123, moving element position feedback is transmitted to the controller 200. The controller 200 decodes the moving element position feedback to determine the position of the moving element 104.

The controller 200 provides processing for sampling the sensors 122, 123 and resolving the position of each moving element 104 located in the associated track section 102. Broadly speaking, the processing associates the machine readable medium 120 of any given moving element 104 with the identified sensor 122, 123 at any time so that the position of the given moving element 104 can be calculated based on a fixed position of the associated sensor 122, 123 and a relative position of tile machine readable medium 120 in relation to the associated sensor 122, 123. In addition, when the machine readable medium 120 simultaneously engages a plurality of sensors 122, 123, the processing transfers or hands-off the association or "ownership" of the moving element 104 from the current sensor 122, 123 to an adjacent engaged sensor 122, 123. In this manner, the position of an identified moving element 104 can be continuously tracked.

Those skilled in the art will appreciate that the position sensing system 121 may be magnetic, optical, colour optical, capacitive, or may be another alternative system. For example, the machine readable medium can be a magnetic strip and the sensors 122, 123 can be corresponding magnetic detectors. Such an embodiment may provide very fine resolution. In some cases the machine readable medium can be configured to provide 1 micron or better resolution. The position accuracy of the moving element 104 is only limited by the resolution of the position sensing system 121.

With optical machine readable media, signals are typically only generated when there is movement. The controller 200 counts up or down in accordance with the direction of travel of the moving element 104. Magnetic machine readable media may produce a position reading whether the moving element 104 is moving or not as magnetic detectors may detect the strength of a magnetic field on the machine readable medium.

Figure 5A:
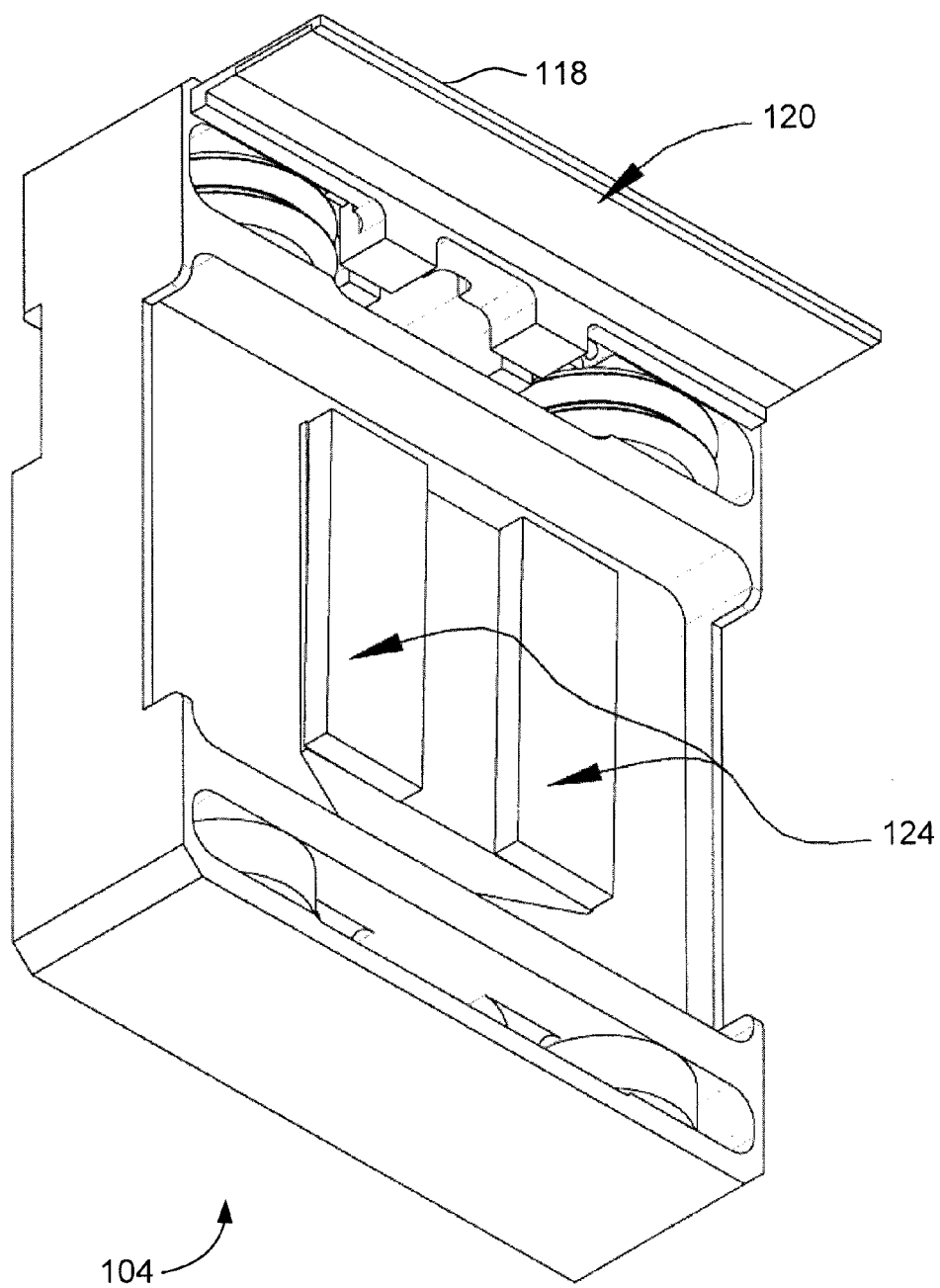
FIG. 5A is a rear view of the moving element having with a machine readable medium.
Figure 5B:
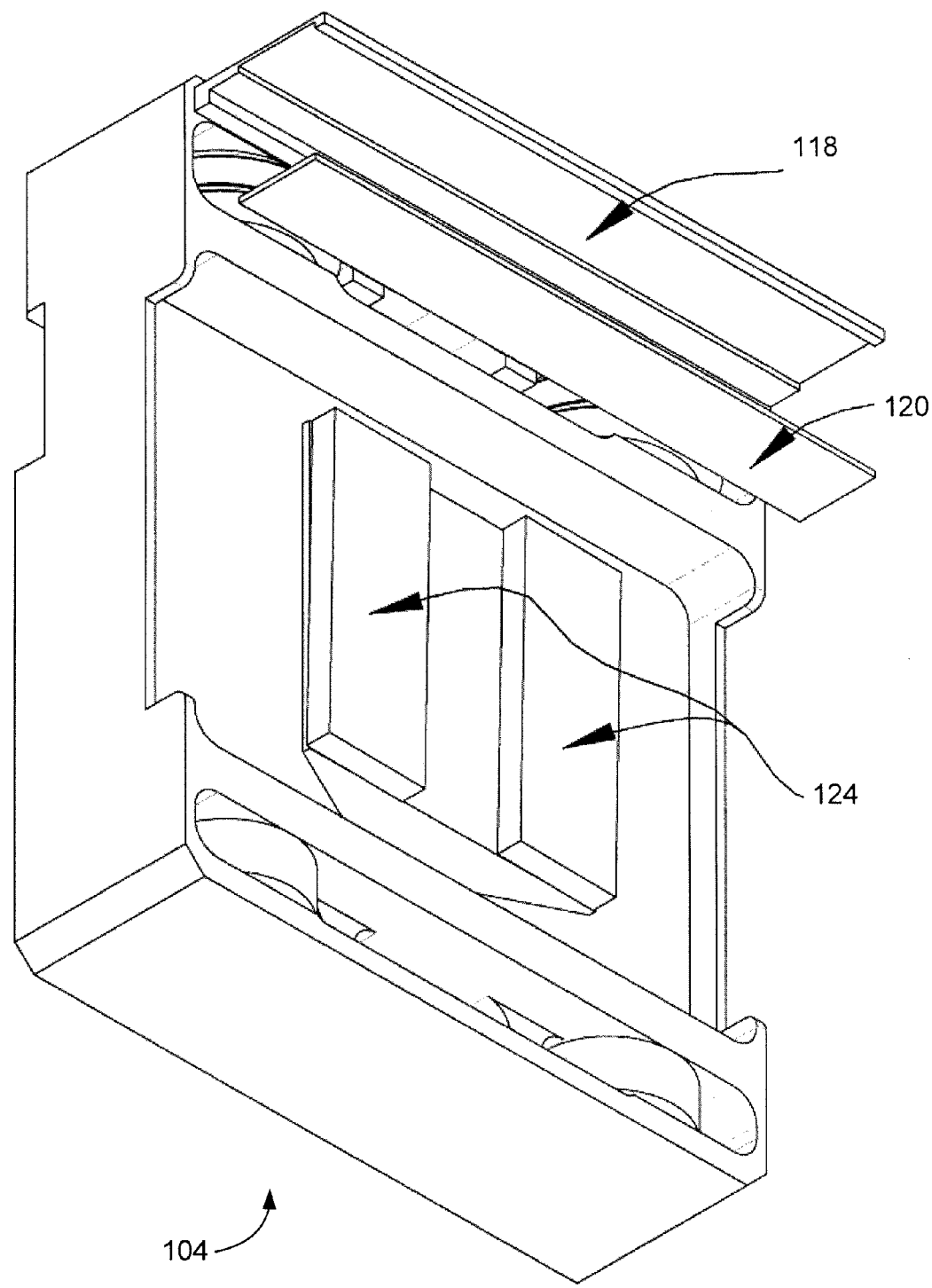
FIG. 5B is an exploded rear view of the moving element with the machine readable medium removed.

FIGS. 5A and 5B show a moving element 104 when removed from the track 106. The moving element 104 has the machine readable medium 120 on the extension 118. The machine readable medium 120 is read by the sensors 122, 123 to determine the moving element's position as the moving element 104 travels along the track 106. This position feedback is then used to control the movement of the moving element 104. The moving element 104 has elements 124, such as permanent magnets, that interact with the stator armature 112 and coils 114 in the corresponding track section 102 to move along direction 126 of FIG. 1.

FIG. 6A shows an example single channel magnetic machine readable medium 300 including zones 301. In this case, each zone 301 has a north pole 302 and a south pole 304 creating a magnetic sinusoidal pattern. For example, the zone 301 contains a 2 mm north pole 302 and a 2 mm south pole 304, for a total zone width of 4 mm. The sinusoidal pattern may be resolved into a 'zone count' value. In an example, the zone count may be any value between 0 and 4096; however, the quantity of zone count values within a zone width will depend on the magnetic resolution of the sensors and the machine readable medium. The sensors 122, 123 sense the zones 301 to determine the location of the machine readable medium 300 within a zone pitch. The zone pitch is the spacing of each zone 301 (for example, 4 mm). The zone count may be equated with a physical distance in the zone such that resolution of the zone count and the zone can provide a physical position of a moving element 104 in relation to the sensors 122, 123 providing the reading, which can then resolve to a position of the moving element on the track, as described herein. In an example, each zone count value may be approximately equivalent to one micron in physical length along the zone.

In other embodiments, the zones may have other arrangements, for example, they may contain a different number of poles. For example, one zone may contain one north pole, one south pole, both a north and south pole, north-south-north poles, south-north-south poles, or north-south-north-south poles, or the like.

FIG. 6B shows an example machine readable medium 400 with a first channel 406 and a second channel 408. The first channel 406 has first zone 401a with a first set of poles 402a, 404a at a first zone pitch 410 (for example, 4.0 mm) while the second channel 408 has a second zone 401b with a second set of poles 402b, 404b at a second zone pitch 412 (for example, of 3.9 mm). The size difference between the first zone pitch 410 and the second zone pitch 412 results in a phase difference between the zones 401a of the first channel 406 and the zones 401b of the second channel 408. This dual channel configuration 400, with zones 401a, 401b and poles 402a, 402b and 404a, 404b having a phase difference, is intended to provide position feedback and identification tracking of the moving element 104. In general, the dual channel machine readable medium 400 can be configured to provide more precise location information than the single channel machine readable medium 300.

In a dual channel machine readable medium system, the track section 102 may include the first sensor 122 and the second sensor 123. The first and second sensors 122, 123 are offset from one another such that the first sensor 122 reads one channel and the second sensor 123 reads the other channel. Further, the second sensor 123 is angled relative to the first sensor 122 to work with the phase difference. For example, the sensor 123 may be angled such that the 3.9 mm pitch reads like a 4 mm pitch. This offset is intended to allow sensor 123 to be the same as sensor 122. In an example, the sensor 123 may be angled such that the hypotenuse of the right angle triangle formed between the machine readable medium with the 3.9 mm pitch and the sensor 123 is 4 mm.

In embodiments where there are two channels 406, 408, the sensors 122, 123 may or may not be aligned with each other along direction 126 of FIG. 1 as the sensors 122, 123 read the machine readable medium. Where the sensors 122, 123 are not physically aligned, an offset can be incorporated when determining the phase difference.

Position feedback is provided by the sensors 122, 123 that are positioned along the track 106 to read both the first and second channels 406, 408 of the dual channel machine readable medium 400. At any given position, the first sensor 122 reads a value from the first channel 406 (for example, between 0-4095 in a 4.0 mm zone pitch) and the second sensor 123 reads a value from the second channel 408 (for example, between 0-4095 in a 3.9 mm zone pitch). The difference in the values read is divided by the phase difference (for example, 0.1 mm) to determine the total phase shift between the readings. With this phase shift, the controller 200 determines what zone or zones on the machine readable medium 400 the sensors 122, 123 are reading and thus the position of the moving element 104 on the track section 102. The system 100 may also combine the readings from multiple sensor pairs 122, 123 reading concurrently to provide a further accuracy than one sensor pair 122, 123 could provide on its own. The conveyor system 100 may also average, or the like, multiple readings to provide a higher resolution feedback than a single sensor pair 122, 123 could provide.

The phase difference allows the controller 200 to determine which zone the two sensors 122, 123 are currently engaging with. Once the controller 200 knows which zone the sensors 122, 123 are engaged with, the controller 200 can determine the position of the moving element 104 relative to the sensors 122, 123. A sensor 122, 123 provides the position within a zone. The controller 200 initially determines which zone or zones the moving element 104 is located on the machine readable medium. For example, where the machine readable medium is a magnetic strip, the magnetic strip may have 36 zones and the controller 200 determines which of the 36 zones the sensor 122, 123 is over to determine the position of the moving element 104. Once the controller 104 has the zone for each channel 406, 408, the controller 200 can track the moving element 104 from then on.

Where the machine readable medium 400 has two channels 406, 408, a first channel 406 with zones 401a having a 4 mm zone pitch and a second channel 408 with zones 401b having a 3.9 mm zone pitch, if the machine readable medium 400 moves 2 mm through a given sensor 122, 123, such movement will cause the readings to increase or decrease by 2,048 counts depending on the direction of travel. The sensor 122, 123 may provide a 4096 count resolution over each zone. If either sensor 122, 123 crosses a boundary between zones, the position readings will either drop to 0 and increment up or jump to 4095 and decrement down depending on the direction of travel at the zone boundary.

The controller 200 may include calibration values for each sensor 122, 123 to compensate for system variability including variability due to tolerance stack ups. In an example, the sensors 122, 123 read 0 to 4095 zone count values over each zone. A discontinuity may exist at the edge of each zone, where the counts jump from 0 to 4095 or 4095 to 0. The controller 200 accounts for this discontinuity to avoid spurious results when determining which zones the sensor 122, 123 is reading. Accounting for this discontinuity may include, for example, disregarding the readings proximate to the edges of each zone, adding space on either side of the edges of the zone, or the like. The spurious result may be due to system variability resulting from factors such as calibration error, thermal expansion, and noise in sensor readings. As the spurious results may be greater at the extremes and less towards the center of the machine readable medium 400, the sensor readings may be biased towards the center of the machine readable medium when determining which zone the sensor 122, 123 is reading.

In some cases, two or more sensor pairs 122, 123 may be engaged with each channel 406, 408 of the machine readable medium 400 at the same time. It is intended that multiple sensor engagement may provide increased precision when determining the position of the moving element 104. The controller 200 having received zone readings from multiple sensors per channel may use the readings in any appropriate manner to determine the position of the moving element 104. In one example, the reading closest to the center of the moving element 104 may be used.

Figure 7B:
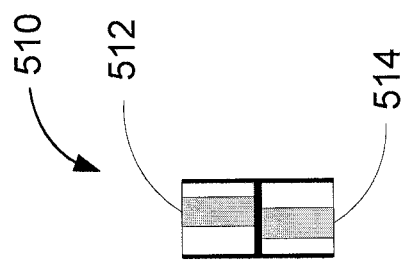
FIGS. 7A and 7B are identification sections of a machine readable medium, in accordance with a further embodiment.
Figure 7A:
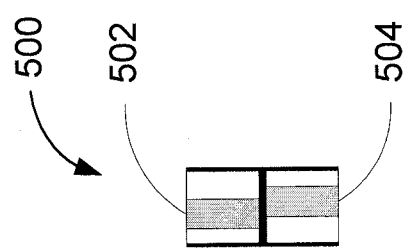

FIG. 7A shows an example of a segment 500 of a dual channel machine readable medium that is configured to provide a unique identifier. The segment 500 has a first zone 502 and a second zone 504. The first zone 502 is out of phase from the second zone 504. The amount that the zones 502, 504 are out of phase, the phase difference, is used in this embodiment to represent an identifier that is unique to each moving element 104. The identifier may be a unique identification number for machine readable medium 120 of the moving element 104 being read. The identifier may alternatively be a reference to a unique identification number. The reference is used by the controller 200 to call or look up the unique identification number. The identifier is read by the same sensors 122, 123 that read the position of the moving element 104. The unique identification number may be used for identification tracking of the moving element 104, or for pallets, fixtures, and products on the moving element 104.

FIG. 7B shows an example of a segment 510 of a dual channel machine readable medium configured to provide a unique identifier different from the segment 500 of FIG. 7A. The segment 510 has a first zone 512 and a second zone 514 out of phase from each other. The phase difference is different from the phase difference between 502 and 504 in order to result in a different identifier.

FIG. 8A shows a machine readable medium 600 having an identification tracking section 602 (for example, as described with reference to FIG. 7A) and a position feedback section 604 (for example, as described with reference to FIG. 6B). In some embodiments, the same sensors 122, 123 and machine readable medium 600 configuration may be used for both identification and position. With the machine readable medium 600, the sensor 122, 123 reads the identifier from the identification tracking section 602 at the same speed that the sensor 122, 123 reads the moving element's position from the position feedback section 604. The identifier may be read while the moving element 104 is moving such that the moving element 104 does not have to stop at the sensor 122, 123. The identifier may be available at any sensors 122, 123 positioned throughout the conveyor system 100.

The controller 200 determines whether readings are from the identification tracking section 602 or the position feedback section 604 of the machine readable medium 600. Once the conveyor system 100 is initialized, the controller 200 keeps track of which section of the machine readable code the readings are coming from. In some cases, upon initialization, the moving element 104 may require a slight movement, generally in the range of 1-2 mm, to resolve any uncertainty about whether the sensors 122, 123 are reading an identification tracking section 602 or a position feedback section 604. In further cases, the slight movement may also or alternatively be used to determine whether a sensor 122, 123 is reading a value on the fringe of a machine readable medium 600 which may be causing the reading to be invalid.

With the machine readable medium 600, there is no additional tag or label required as identification is built into the positioning system. There is no need to mount additional machine readable media to the moving element 104 and the same sensors 122, 123 used for tracking position are used to read the unique identifier. No additional hardware may be needed.

FIG. 8B shows a machine readable medium 610 having an identification tracking section 612 and a position feedback section 614. The machine readable medium 610 has one channel. In this embodiment, general position feedback is provided from a sensor 122 sensing the position feedback section 614, while the sensor 123 senses an identifier from the identification tracking section 612. The controller 200 compares the position feedback section 614 and the identification tracking section 612 to determine the identifier. In some cases, after the conveyor system 100 has been initialized, the controller 200 keeps track of whether a sensor 122, 123 is reading the position feedback section 614 or the identification tracking section 612. As the moving element 104 is at a known position in the position feedback section 614, the controller 200 may read the identification value from the identification tracking section 612. The identification value may be set based on the location of the identification tracking section 612 relative to the position feedback section 614.

In some cases, a zone finding scheme may need to be implemented upon initialization. In a basic example, the moving element 104 may be moved until the sensor 122, 123 passes the end of the machine readable medium 610. The moving element 104 may then be moved such that the sensor 122,123 passes over the machine readable medium 610. The sensor 122, 123 can then detect the edge of the machine readable medium 610. The controller 200 may then use zone counts, or the like, to track the moving element 104 during operation. At that point, the position feedback section 614 may be used for determining position and the identification tracking section 612 may be used to determine identification.

One of skill in the art that other methods of initialization may be available depending on the number of channels and the like, including those involving smaller movements of the moving element such as taking a reading and predicting subsequent readings then moving slightly to determine if the predictive subsequent readings were correct and the like.

In some cases, the machine readable medium 600, 610 may include extra space on either or both sides of the machine readable medium 600, 610 to allow for spurious readings or the like. In an example, where the identification tracking section 602, 612 zones are 4 mm in length, the identification tracking section 602, 612 zones may be 6 mm in length as it includes a 2 mm buffer at the edge of the zones.

Figure 9:
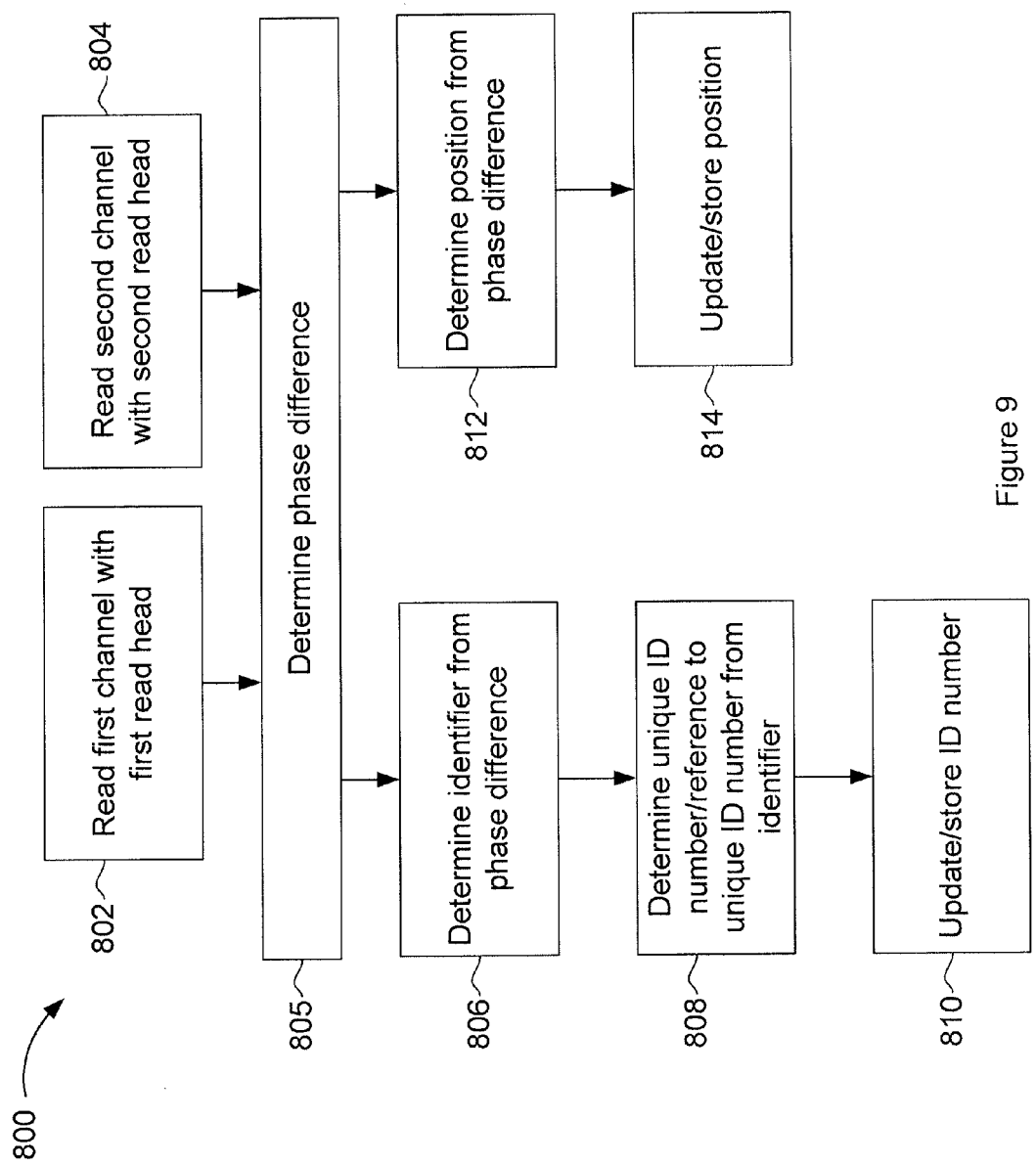
FIG. 9 is a flow chart of a method for tracking a moving element, in accordance with an embodiment.

FIG. 9 illustrates a method 800 for tracking a moving element in a conveyor system, in accordance with an embodiment. A first sensor reads, 802, a first channel of a machine readable medium. A second sensor reads, 804, a second channel of the machine readable medium. A controller determines, 805, a phase difference.

The controller determines, 806, an identifier from the phase difference. A unique identification number and/or a reference to a unique identification number is determined,

808, from the identifier. The controller is updated, 810, with the identification number of the moving element.

The controller determines which zone each sensor 122, 123 is reading from the phase difference. The controller determines, 812, the position of the center (or other point) of the moving element 104 based on the known location of the sensor pair 122, 123 and the determined zone or zones of the machine readable medium 600, 610.

The conveyor system controller is updated, 814, with the position of the moving element.

It will be understood that, while the moving element 104 is called a moving element, the moving element 104 need not be moving to give a reading to the sensor 122, 123. Rather, the 'moving' in moving element refers to the ability of the moving element to move over the track section 102.

The sensors 122, 123 are intended to be robust while they are being used in the control of the moving elements 104. The conveyor system 100 may use the same or similar hardware for the unique identifier so that it will also have similar robust characteristics. Where the conveyor system 100 described herein is used to operate an assembly line, the robustness may be advantageous because the conveyor system 100 is intended to operate consistently without faults.

Further, the position and identification tracking described herein may be applied beyond a linear motor conveyor to any appropriate type of conveyor or transport system, for example, a conventional belt-type conveyor. For example, a pallet in a belt-type conveyor could be provided with a machine readable medium 600, 610 and a workstation associated with the belt-type conveyor could be provided with a sensor pair 122, 123 such that, as the pallet passes or is stationed at the workstation, the position of the pallet relative to the workstation and the ID of the pallet could be determined from the sensor readings.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for tracking position of a moving element on a linear motor conveyor system having a track, the system comprising:
    a machine readable medium provided to one of the moving element or the track of the linear motor conveyor system, wherein the machine readable medium is configured with at least two channels with a first predetermined phase difference therebetween;
    an identification (ID) medium provided to the one of the moving element or the track having the machine readable medium, wherein the identification medium is configured with at least two channels with a second predetermined phase difference therebetween;
    a sensor provided to the other of the moving element or the track of the linear motor conveyor system, wherein the sensor is configured to read the at least two channels of the machine readable medium and the at least two channels of the ID medium; and
    a controller configured to receive data from the sensor and determine a position of the moving element on the track as the moving element moves along the track of the linear motor conveyor system based on the first predetermined phase difference, and wherein the controller determines an identifier of the moving element based on the second phase difference based on data received from the sensor.

2. The system of claim 1, wherein the sensor is located on the track and the machine readable medium is located on the moving element.

3. The system of claim 1, wherein the machine readable medium is a magnetic strip and the sensor is a magnetic detector.

4. The system of claim 1, wherein the at least two channels of the machine readable medium comprises a first channel and a second channel and wherein the sensor comprises a first sensor configured to read the first channel and a second sensor configured to read the second channel.

5. The system of claim 1, wherein the track comprises a linear motor and the moving element comprises a plurality of magnetic elements that engage with the linear motor.

6. A method for tracking a moving element on a track of a linear motor conveyor comprising:
    reading first data from a first channel of a machine readable medium located on one of the moving element or the track of the linear motor conveyor;
    reading second data from a second channel of a machine readable medium located on one of the moving element or the track of the linear motor conveyor, wherein the second channel has a first predetermined phase difference from the first channel;
    determining a position of the moving element on the track as the moving element moves along the track of the linear motor conveyor system based on the first data and the second data;
    reading first data from a first channel of an identification (ID) medium located on one of the moving elements or the track having the machine readable medium;
    reading a second data from a second channel of an identification (ID) medium located on one of the moving elements or the track of having the machine readable medium, wherein the second channel has a second predetermined phase difference from the first channel; and determining an identifier of the moving element based on the second predetermined phase difference.

7. The method of claim 6 wherein the first data and the second data are read by a plurality of sensors.

8. The method of claim 6 further comprising:

determining an identifier of the moving element based on the phase difference between the first data and the second data.

9. A system for providing identification for a moving element on a conveyor system having a track, the system comprising:

a machine readable medium provided to one of the moving element or the track of the linear motor conveyor system, wherein the machine readable medium is configured with a first phase difference;

an identification (ID) medium provided to one of the moving element or the track having a the machine readable medium, wherein the identification medium is configured with a second predetermined phase difference therebetween;

a sensor provided to the other of the moving element or the track of the linear motor conveyor system, wherein the sensor is configured to read the machine readable medium and the identification medium; and a controller configured to receive data from the sensor and determine a position and an identifier of the moving element based on the first and second phase differences as the moving element moves along the track of the linear motor conveyor system.

10. The system of claim 9, wherein the machine readable medium includes at least two channels and the sensor is configured to read the at least two channels.

11. A position and identification tracking system for a moving element on a track of a linear motor conveyor, the system comprising:

a machine readable medium configured with at least two channels with a predetermined phase difference therebetween, wherein the predetermined phase difference comprises a first predetermined phase difference and a second predetermined phase difference, and wherein the position is determined based on the first predetermined phase difference and the identification is determined based on the second predetermined phase difference; and a sensor configured to read the at least two channels;

wherein a position and an identification is determined for the moving element on the track as the moving element moves along the track of the linear motor conveyor, based on the phase difference.

\* \* \* \* \*